United States Patent
Sone et al.

(10) Patent No.: US 10,731,745 B2
(45) Date of Patent: Aug. 4, 2020

(54) OIL-BUBBLE REDUCING STRUCTURE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kosuke Sone, Mie (JP); Hiroki Hirai, Mie (JP); Makoto Higashikozono, Mie (JP); Mitsuhiro Shimamura, Mie (JP); Tadashi Goto, Mie (JP); Kana Hashimoto, Mie (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 59 days.

(21) Appl. No.: 15/991,547

(22) Filed: May 29, 2018

(65) Prior Publication Data
US 2018/0363759 A1    Dec. 20, 2018

(30) Foreign Application Priority Data
Jun. 14, 2017 (JP) .................. 2017-117086

(51) Int. Cl.
F16H 57/04 (2010.01)

(52) U.S. Cl.
CPC ..... *F16H 57/0404* (2013.01); *F16H 57/0421* (2013.01); *F16H 57/0435* (2013.01); *F16H 57/0436* (2013.01)

(58) Field of Classification Search
CPC ... F16H 57/0404; B01D 2201/184; B41J 2/19
See application file for complete search history.

(56) References Cited

U.S. PATENT DOCUMENTS

| | | | | |
|---|---|---|---|---|
| 10,343,628 | B2* | 7/2019 | Sone | B60R 16/0207 |
| 2015/0247431 | A1* | 9/2015 | Yuki | B01D 35/02 |
| | | | | 210/435 |
| 2018/0078881 | A1* | 3/2018 | Suzuki | B01D 35/02 |
| 2019/0126170 | A1* | 5/2019 | Studer | B01D 19/02 |

FOREIGN PATENT DOCUMENTS

JP    2012036986 A    2/2012

* cited by examiner

*Primary Examiner* — Benjamin M Kurtz
(74) *Attorney, Agent, or Firm* — Reising Ethington, P.C.

(57) ABSTRACT

A technique that can efficiently reduce the number of oil bubbles. An oil-bubble reducing structure that is arranged in an automatic transmission includes: a filter that is arranged in an oil path for oil flowing through the automatic transmission, wherein the filter has pores formed in its framework having a polygonal cross section.

5 Claims, 8 Drawing Sheets

OIL-BUBBLE REDUCING STRUCTURE

CROSS REFERENCE TO RELATED APPLICATIONS

This application claims the priority of Japanese patent application JP2017-117086 filed on Jun. 14, 2017, the entire contents of which are incorporated herein.

TECHNICAL FIELD

The technique disclosed in the present description relates to a technique for reducing the number of oil bubbles contained in oil within an automatic transmission.

BACKGROUND ART

Oil such as ATF (Automatic Transmission Fluid) flows through the interior of automatic transmissions of vehicles. In the course of the oil flowing through the automatic transmissions, air may be incorporated into the oil to create oil bubbles. Oil bubbles are air covered with oil films, and thus once oil bubbles are created, there is the problem that control of the oil pressure is difficult. This is because the pressure applied to oil is reduced as a result of the air inside the oil bubbles deflating.

In order to solve the above-described problem, JP 2012-36986A discloses a structure in which a breather chamber attached to an automatic transmission has a wall with protrusions. The protrusions are configured to extinguish oil bubbles by colliding with the oil bubbles.

JP 2012-36986A is an example of related art.

SUMMARY

However, according to the above-described configuration, if oil flows through a region apart from the wall with the protrusions, the number of oil bubbles contained in the oil cannot be reduced. Accordingly, a technique for efficiently reducing the number of oil bubbles is in demand.

The technique disclosed in the present description was made in view of the circumstances as described above, and it is an object thereof to provide a technique for efficiently reducing the number of oil bubbles.

According to the technique disclosed in the present description, an oil-bubble reducing structure that is arranged in an automatic transmission includes: a filter arranged in an oil path for oil flowing through the automatic transmission, wherein the filter has pores formed in its framework having a polygonal cross section.

According to the above-described configuration, oil bubbles are separated from the oil by the filter arranged in the oil path. The oil bubbles separated by the filter come into contact with the framework of the filter. Since the framework has a polygonal cross section, the oil bubbles rupture when they come into contact with ridge line portions of the framework. According to the technique disclosed in the present description, it is thus possible to efficiently reduce the number of oil bubbles when oil passes through the filter arranged in the oil path.

The following aspects are preferable as embodiments of the technique disclosed in the present description.

Preferably, the oil path may be provided with a pump for causing the oil to flow, and the filter may be disposed on an upstream side, in a direction in which the oil flows, of the pump in the oil path.

According to the above-described configuration, it is possible to reduce the number of oil bubbles using the filter disposed on the upstream side of an oil intake port of the pump. Accordingly, oil with the reduced number of oil bubbles flows into the oil intake port of the pump, and thus it is possible to easily control the oil pressure applied by the pump.

Preferably, the oil path may be provided with a plurality of filters that are lined up in the direction in which the oil flows, and the plurality of filters are lined up in order of their increasing protrusion length from the upstream side to the downstream side in a direction in which the oil flows, the protrusion length referring to a size of the filters protruding from the inner wall of the oil path.

According to the above-described configuration, firstly, by using the filter arranged on the most upstream side, the number of oil bubbles contained in the oil that has passed through this filter can be reduced. At this time, since the most upstream filter has the smallest protrusion length, which is the size of the filter protruding from the inner wall of the oil path, the oil flowing through the oil path includes a portion thereof that has not passed through the most upstream filter. The number of oil bubbles contained in the portion of the oil that has not passed through the most upstream filter has not been reduced.

Then, when the oil passes through the second filter from the upstream side, since the number of oil bubbles has been reduced in the region on the downstream side of the most upstream filter, the second filter is prevented from being clogged with oil bubbles. On the other hand, the number of oil bubbles is reduced in the portion of the oil that has not passed through the most upstream filter but has passed through the second filter.

In this way, as a result of oil passing though the plurality of filters having different protrusion lengths, the number of oil bubbles is reduced sequentially, and these filters can be prevented from being clogged with oil bubbles.

Preferably, the automatic transmission may include a wiring board on which a wire harness is arranged, and the filter may be disposed on the wiring board.

According to the above-described configuration, even if oil falls from above onto the wire harness and oil bubbles are created, the number of oil bubbles can be efficiently reduced by the filter disposed on the wiring board on which the wire harness is arranged.

According to the technique disclosed in the present description, it is possible to efficiently reduce the number of oil bubbles.

EMBODIMENTS

Embodiment 1

Embodiment 1 according to the technique disclosed in the present description will be described with reference to FIGS. 1 to 7. An oil-bubble reducing structure 40 disclosed in the present description is provided with a wiring unit 10; and a filter 31 disposed on the wiring unit 10. The wiring unit 10 according to the present embodiment is arranged in an automatic transmission 11 that is installed in a vehicle (not shown). In the following, a description will be given assuming that the Z direction refers to an "up" direction, the Y direction refers to a "front" direction, and the X direction refers to a "right" direction. Furthermore, there may be cases where reference signs are given to some of a plurality of the same members and are not given to the remaining members.

Figure 2:
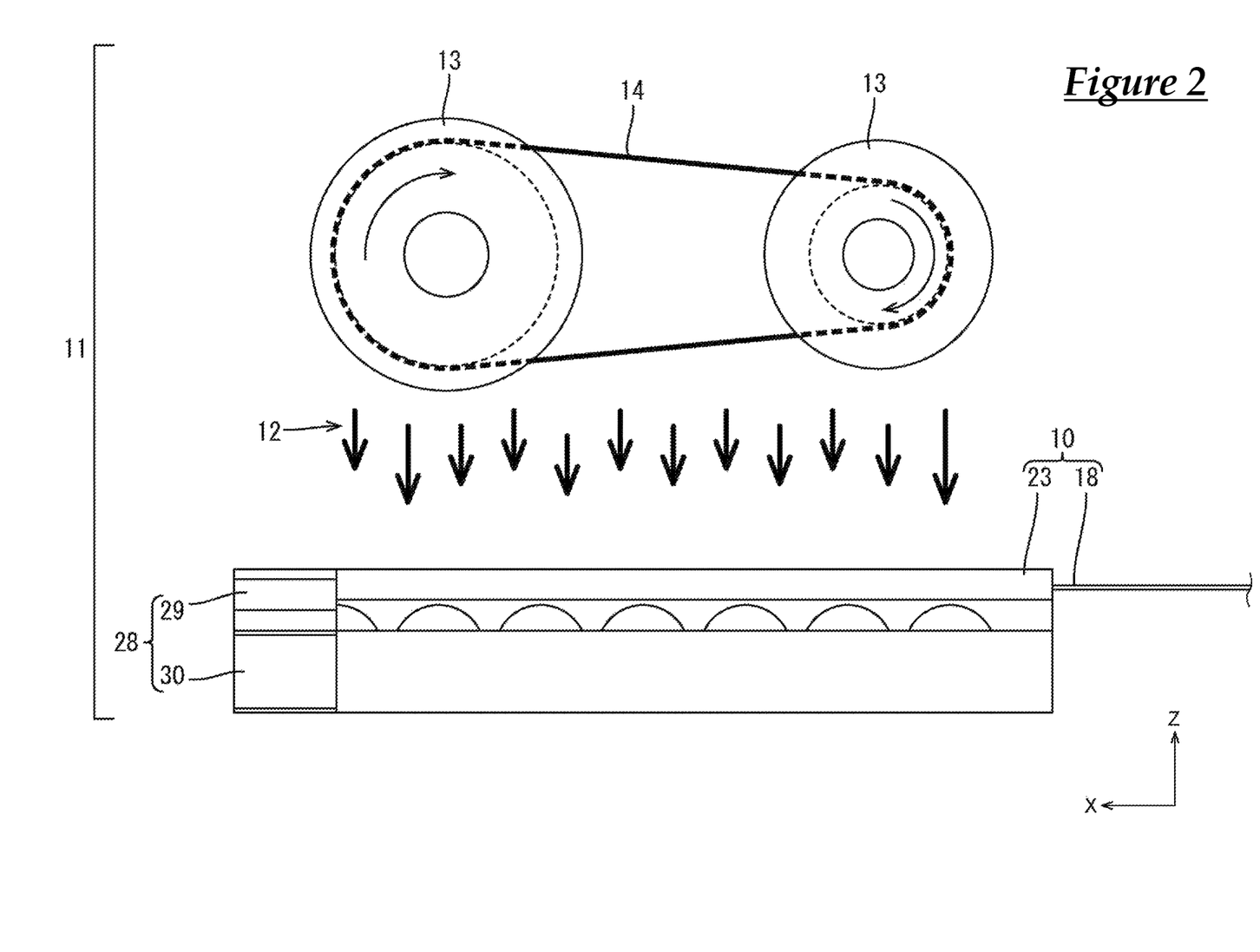
FIG. 2 is a schematic side view illustrating a layout of the wiring unit in an automatic transmission.

As shown in FIG. 2, the wiring unit 10 is arranged at a position at which oil 12 circulating inside the automatic transmission 11 falls onto the wiring unit 10 from above. As shown in FIG. 2, in the present embodiment, the wiring unit 10 is disposed at a position below a pair of pulleys 13 and a belt 14 that spans the pair of pulleys 13, the pulleys 13 and the belt 14 constituting the automatic transmission 11.

Figure 3:
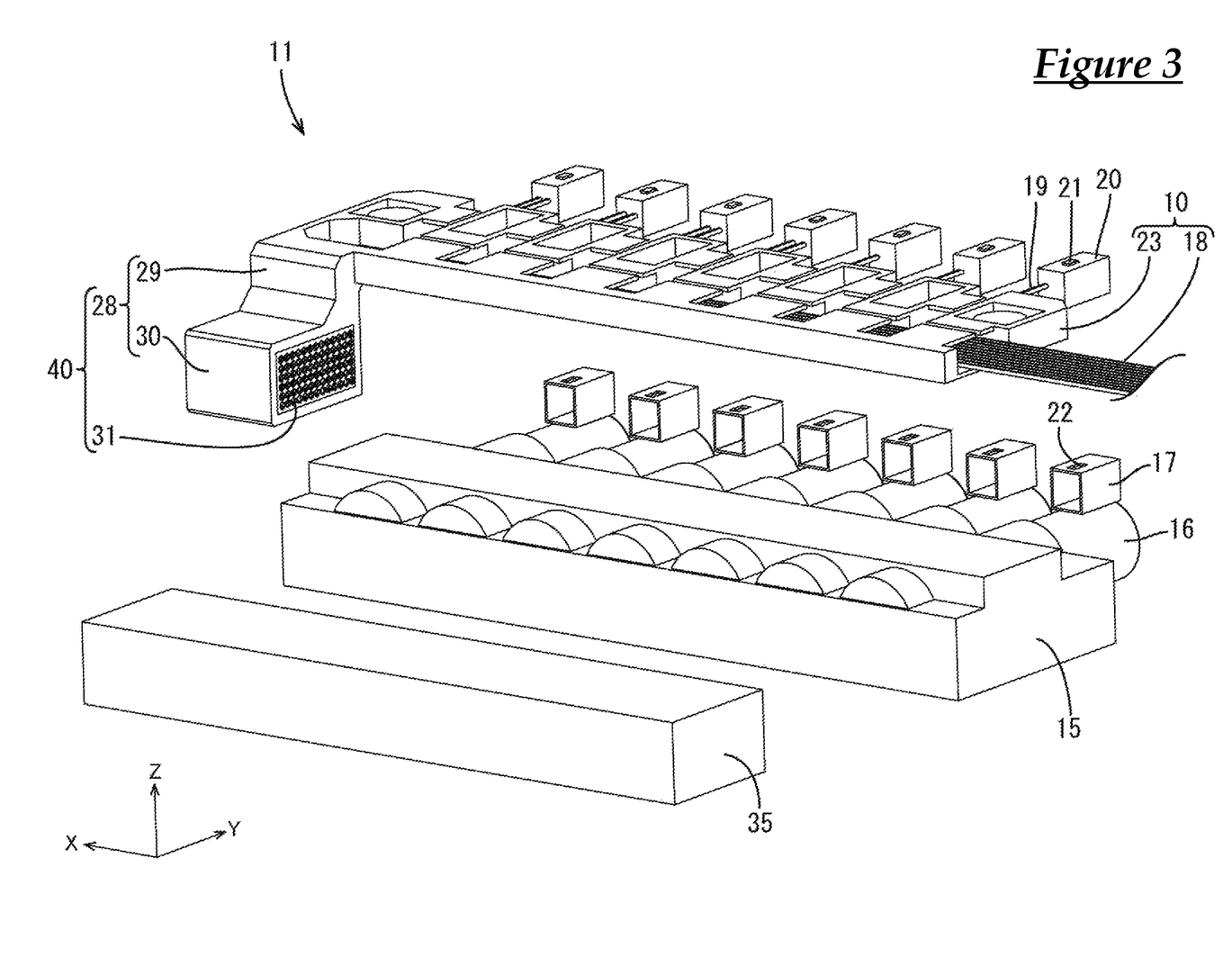
FIG. 3 is an exploded perspective view illustrating the wiring unit, a valve body, and a pump.

A valve body 15 constituting the automatic transmission 11 is provided with a plurality of (seven, in the present embodiment) solenoid valves 16 lined up in a left-right direction. The solenoid valves 16 are substantially circularly tubular. Equipment-side connectors 17 are arranged on the respective solenoid valves 16.

Figure 1:
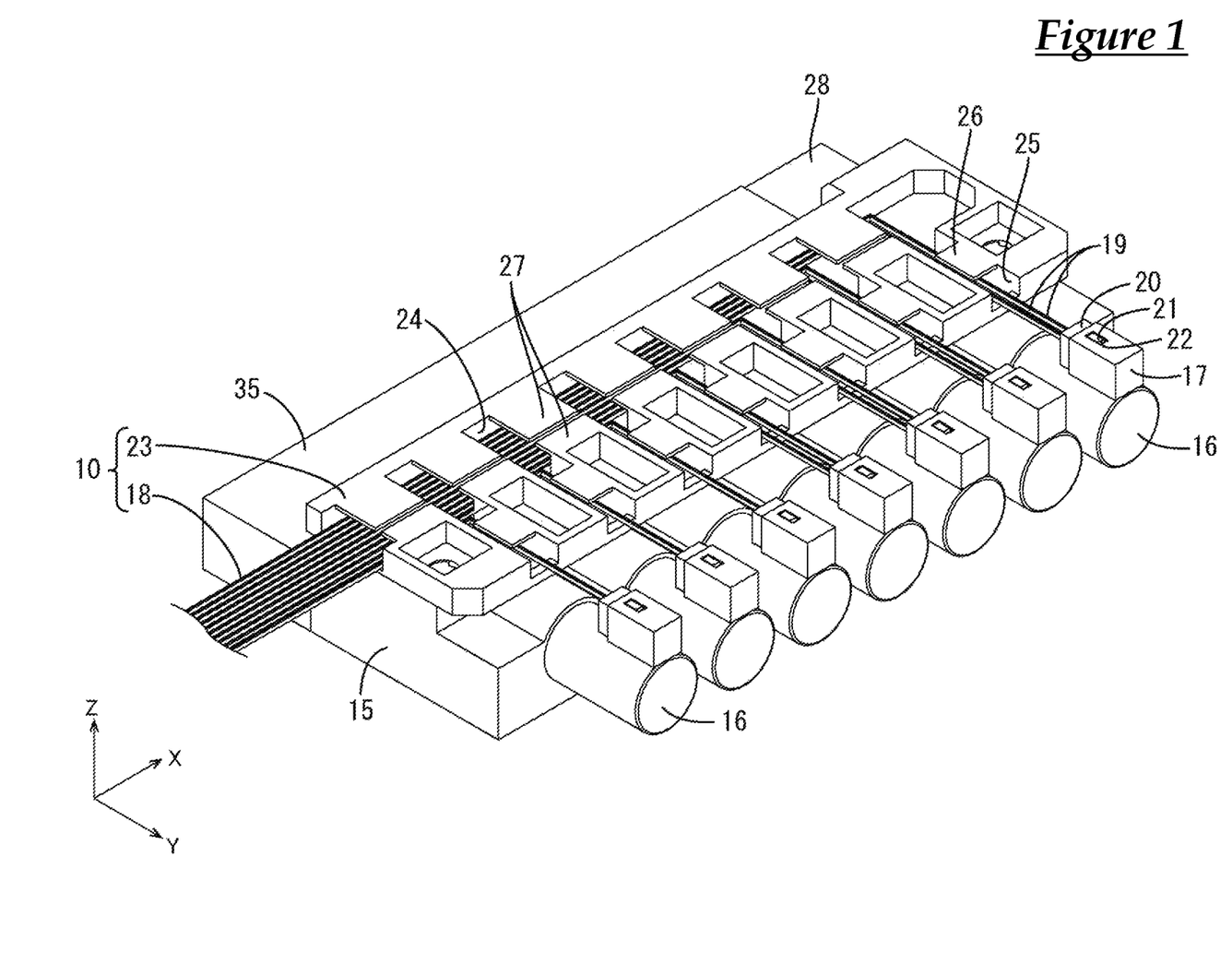
FIG. 1 is a perspective view illustrating a wiring unit according to Embodiment 1.

The wiring unit 10 is provided with a wire harness 18. The wire harness 18 includes a plurality of electric wires 19. The electric wires 19 each have an end portion to which a wire-side connector 20 is connected. The wire-side connector 20 is connected to the corresponding equipment-side connector 17 while being retained due to a locking part 21 provided on the wire-side connector 20 engaging with a locked part 22 provided on the equipment-side connector 17.

A wiring board 23 is fixed to the upper portion of the valve body 15 with a well-known method such as screwing, using a locking structure, or glueing. The wire harness 18 is arranged on the wiring board 23. For the wiring board 23, any material such as a synthetic resin or metal may be suitably selected as appropriate. The wiring board 23 according to the present embodiment is made of an insulating synthetic resin.

Figure 4:
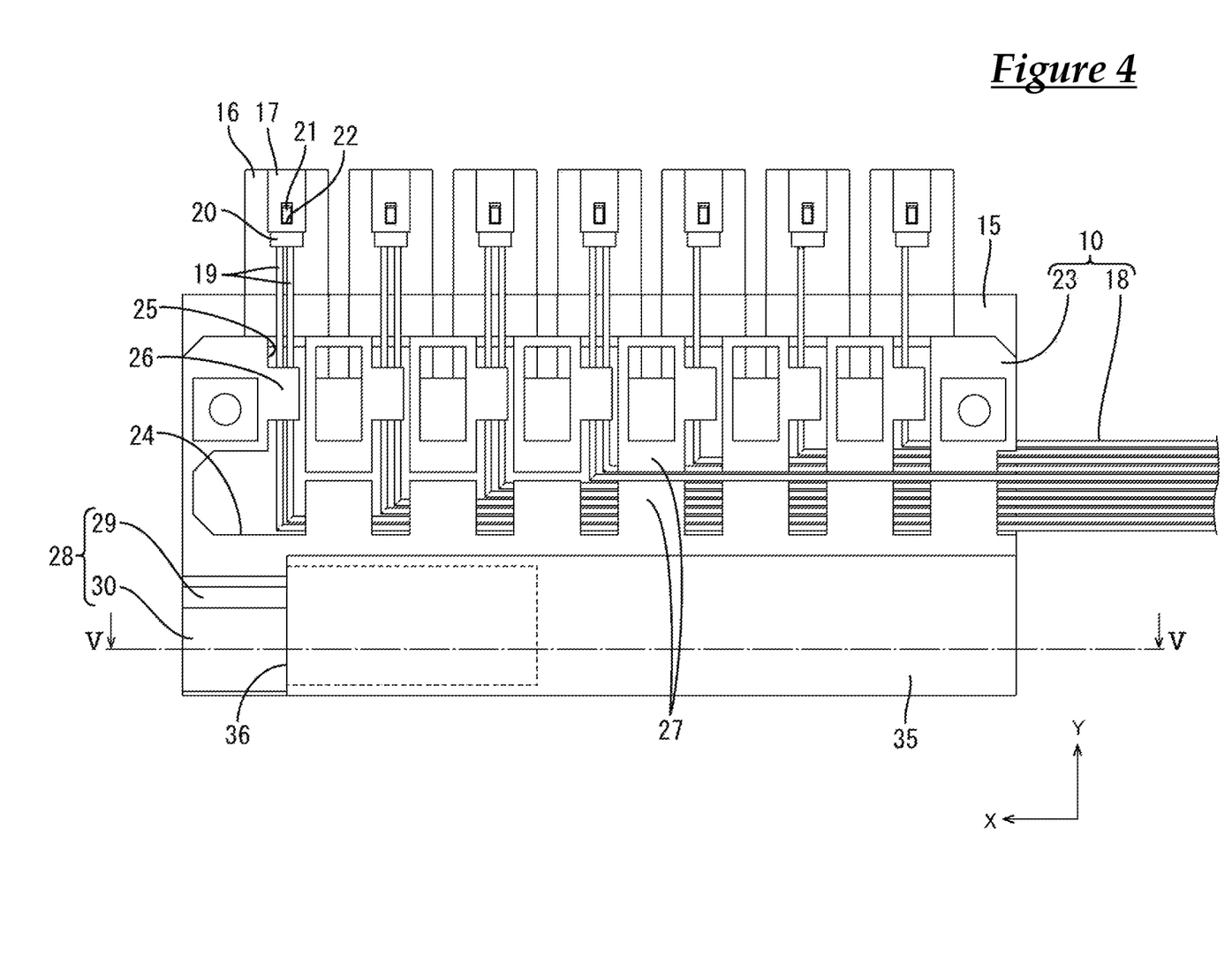
FIG. 4 is a plan view illustrating the wiring unit.

The wiring board 23 is substantially plate-shaped. The wiring board 23 has, on its upper surface, a main routing groove 24, which is open upward and extend in the left-right direction. The right end of the main routing groove 24 is closed, and the left end thereof is open leftward.

The wiring board 23 has a plurality of (seven, in the present embodiment) sub routing grooves 25, which are lined up in the left-right direction and extend to the front. The sub routing grooves 25 are branched from the main routing groove 24. The sub routing grooves 25 are open upward. The rear ends of the sub routing grooves 25 are contiguous to the main routing groove 24, and the front ends of the sub routing grooves 25 are open frontward.

Each electric wire 19 drawn to the rear from the rear end of the corresponding wire-side connector 20 is routed in the sub routing groove 25, and then routed in the main routing groove 24, where it merges with an electric wire 19 connected to another wire-side connector 20. The plurality of electric wires 19 are drawn to the left from the left ends of the main routing groove 24.

Each sub routing groove 25 includes, at the upper end of its right side wall, a wire confining part 26 protruding to the left. A gap is provided between the left end of the wire confining part 26 and the left side wall of the sub routing groove 25, so that the electric wire 19 can be inserted into the sub routing groove 25 from the gap. With the wire confining parts 26, the electric wires 19 arranged in the sub routing grooves 25 can be kept from coming out from the sub routing grooves 25.

The main routing groove 24 has, at the upper ends of its rear and front walls, pairs of wire confining parts 27 that protrude to the inner side of the main routing groove 24. With the wire confining parts 27, the electric wires 19 arranged in the main routing groove 24 are kept from coming out from the main routing groove 24. The wire confining parts 27 provided on the rear wall of the main routing groove 24 protrude to the front, while the wire confining parts 27 provided on the front wall of the main routing groove 24 protrude to the rear. Gaps are provided between the respective pairs of wire confining parts 27, so that the electric wires 19 can be inserted into the main routing groove 24 from the gaps.

Figure 5:
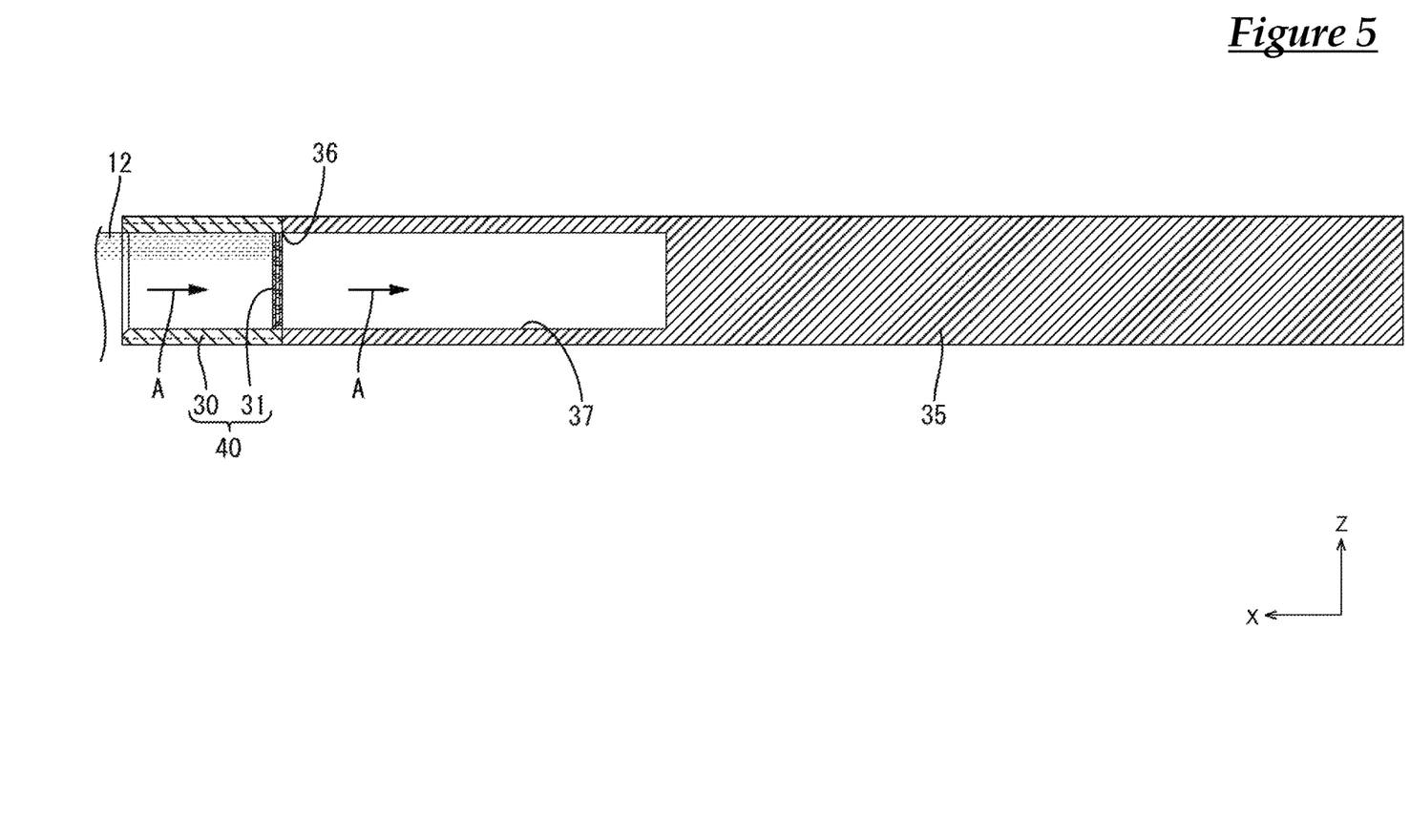
FIG. 5 is a cross-sectional view taken along a line V-V in FIG. 4.

The wiring board 23 includes, at a position close to its right end, an oil collecting part 28 protruding downward. The oil collecting part 28 is provided with: a coupling part 29 suspended downward from the wiring board 23; and a tubular part 30 that protrudes to the rear from the lower end of the coupling part 29 and is open in the left-right direction. The tubular part 30 has a square tubular shape extending in left-right direction. A filter 31, which will be described later, is provided at the left open edge of the tubular part 30. Meanwhile, the right end of the tubular part 30 is open rightward.

A filter 31 is sheet-shaped or plate-shaped. The filter 31 is provided so that its plate surfaces extend in the vertical direction. The filter 31 has a plurality of communication pores that bring the left side of the filter 31 into communication with the right side. Accordingly, oil bubbles contained in the oil 12 are separated by the filter 31 when the oil 12 flows through the filter 31 from its left to right side.

Figure 6:
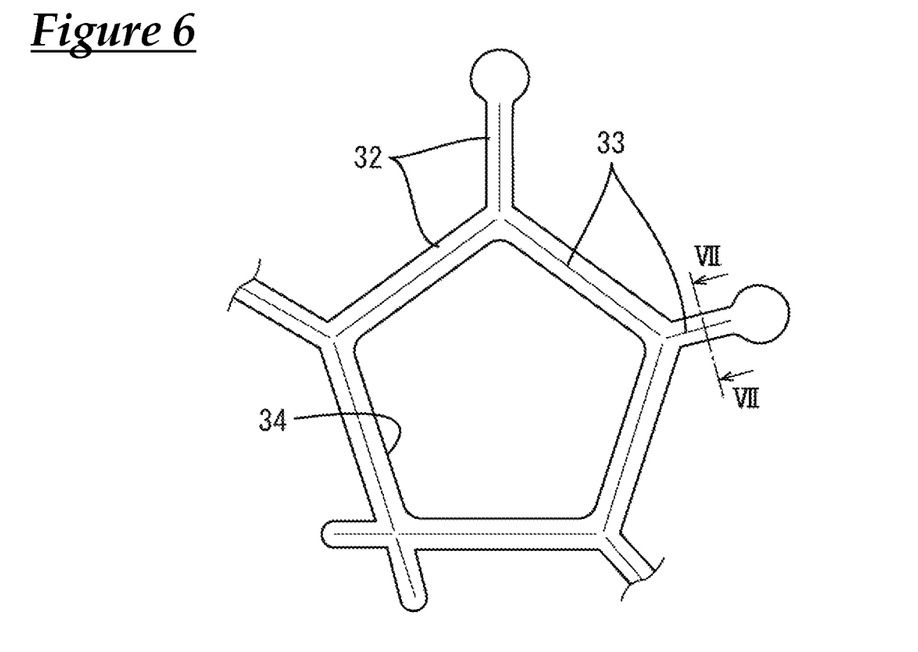
FIG. 6 is a partially enlarged view illustrating a filter.

As shown in FIG. 6, the filter 31 has pores 34 in its framework 32 made of a synthetic resin or metal. If the filter 31 is made of a synthetic resin, any synthetic resin, for example, polyolefin such as polyethylene or polypropylene, polyester such as polybutylene terephthalate, or polyamide such as 6,6-nylon may be suitably selected as appropriate. Furthermore, if the filter 31 is made of metal, any material such as stainless steel, nickel, chromium, a nickel-chromium alloy may be suitably selected as appropriate. For example, Celmet (registered trademark, made of Sumitomo Electric Industries, Ltd.) may suitably be used for the filter 31.

Figure 7:
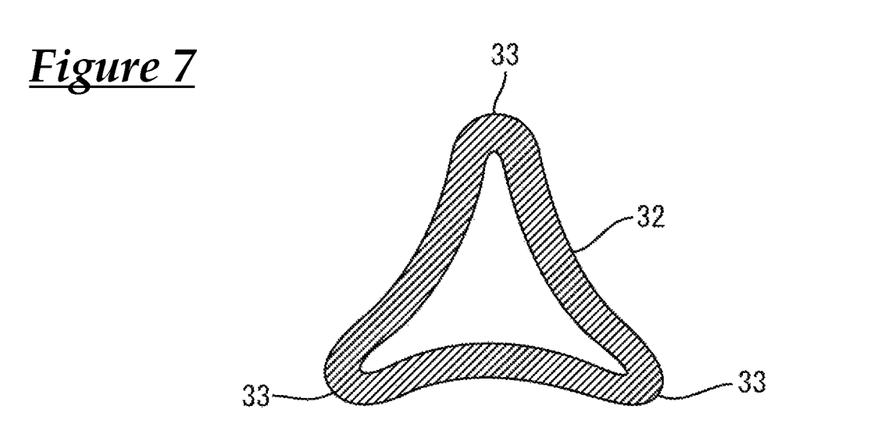
FIG. 7 is a cross-sectional view taken along a line VII-VII in FIG. 6.

As shown in FIG. 7, the filter 31 has the framework 32 having a polygonal cross section. In the present embodiment, the framework 32 has a substantially triangular cross-sectional shape. Accordingly, oil bubbles contained in the oil 12 can be filtered out by the filter 31 and can be ruptured by coming into contact with ridge line portions 33 of the framework 32 of the filter 31.

The filter 31 may be attached to the tubular part 30 with a well-known method such as glueing or screwing. Alternatively, insert molding may be performed to form an integral of the filter 31 and the tubular part 30.

The automatic transmission 11 is provided with a pump 35 for causing the oil 12 to flow through the automatic transmission 11. The pump 35 has an oil intake port 36 into which the oil 12 flowing through the automatic transmission 11 is sucked. The oil intake port 36 of the pump 35 is arranged to the left of the oil collecting part 28. The oil intake port 36 of the pump 35 is open rightward. The pump 35 and the oil intake port 36 are contiguous to each other and form a substantially rectangular parallelepiped. The pump 35 sucks the oil 12 into the oil intake port 36 and discharges the sucked oil 12 from a not-shown discharge port, so as to cause the oil 12 to flow through the automatic transmission 11. The pump 35 is fixed to the valve body 15 with a well-known method such as screwing.

The wiring board 23 and the pump 35 are designed so that, in a state in which they are assembled, the oil intake port 36 of the pump 35 and the left edge of the tubular part 30 match each other. Accordingly, the filter 31 is located on the upstream side, in a direction in which the oil 12 flows, of the oil intake port 36 of the pump 35.

As shown in FIG. 5, due to the oil 12 being sucked from the left edge of the tubular part 30, an oil path 37 is formed in which the oil 12 flows from the tubular part 30 to the downstream side of the oil intake port 36 via the filter 31, in a direction indicated by an arrow A. In other words, the filter 31 is disposed in the oil path 37.

Example of Assembling Procedure

Hereinafter, an example of procedure for assembling the wiring unit 10 according to the present embodiment will be described. The procedure for assembling the wiring unit 10 is not limited to the following description.

Terminal fittings (not shown) are connected to end portions of the plurality of electric wires 19, and the terminal fittings are accommodated in the cavities (not shown) in the wire-side connectors 20.

An insulating synthetic resin material is subjected to injection molding to form the wiring board 23. The plurality of electric wires 19 are routed by being accommodated in the main routing groove 24 and the sub routing grooves 25 of the wiring board 23. The electric wires 19 to which the wire-side connectors 20 are connected are drawn from the front ends of the sub routing grooves 25 of the wiring board. Then, the plurality of electric wires 19 are drawn from the left end of the main routing groove 24 of the wiring board.

The pump 35 is fixed to the valve body 15. Then, the wiring board 23 is fixed to the upper portion of the valve body 15. Subsequently, the wire-side connectors 20 are connected to the equipment-side connectors 17 from the rear. The procedure for assembling the wiring unit 10 is thus complete.

Functions and Effects of the Present Embodiment

Hereinafter, functions and effects of the present embodiment will be described. According to the present embodiment, an oil-bubble reducing structure 40 that is arranged in an automatic transmission 11 includes a filter 31 arranged in an oil path 37 for oil 12 flowing through the automatic transmission 11, wherein the filter 31 has pores 34 formed in its framework 32 having a polygonal cross section.

According to the above-described configuration, oil bubbles are separated from the oil 12 by the filter 31 arranged in the oil path 37. The oil bubbles separated by the filter 31 come into contact with the framework 32 of the filter 31. Since the framework 32 has a polygonal cross section, the oil bubbles rupture when they come into contact with the ridge line portions 33 of the framework 32. According to the present embodiment, it is thus possible to efficiently reduce the number of oil bubbles when the oil 12 passes through the filter 31 arranged in the oil path 37.

Furthermore, according to the present embodiment, the oil path 37 is provided with a pump 35 for causing the oil 12 to flow, and the filter 31 is disposed on an upstream side, in a direction in which the oil 12 flows, of the pump 35 in the oil path 37.

According to the above-described configuration, it is possible to reduce the number of oil bubbles using the filter 31 disposed on the upstream side of the oil intake port 36 of the pump 35. Accordingly, the oil 12 with the reduced number of oil bubbles flows into the oil intake port 36 of the pump 35, and thus it is possible to easily control the oil pressure applied by the pump 35.

Furthermore, according to the present embodiment, the automatic transmission 11 includes the wiring board 23 on which the wire harness 18 is arranged, and the filter 31 is disposed on the wiring board 23.

According to the above-described configuration, even if the oil 12 falls from above onto the wire harness 18 and oil bubbles are created, the number of oil bubbles can be efficiently reduced by the filter 31 disposed on the wiring board 23 on which the wire harness 18 is arranged.

Embodiment 2

Figure 8:
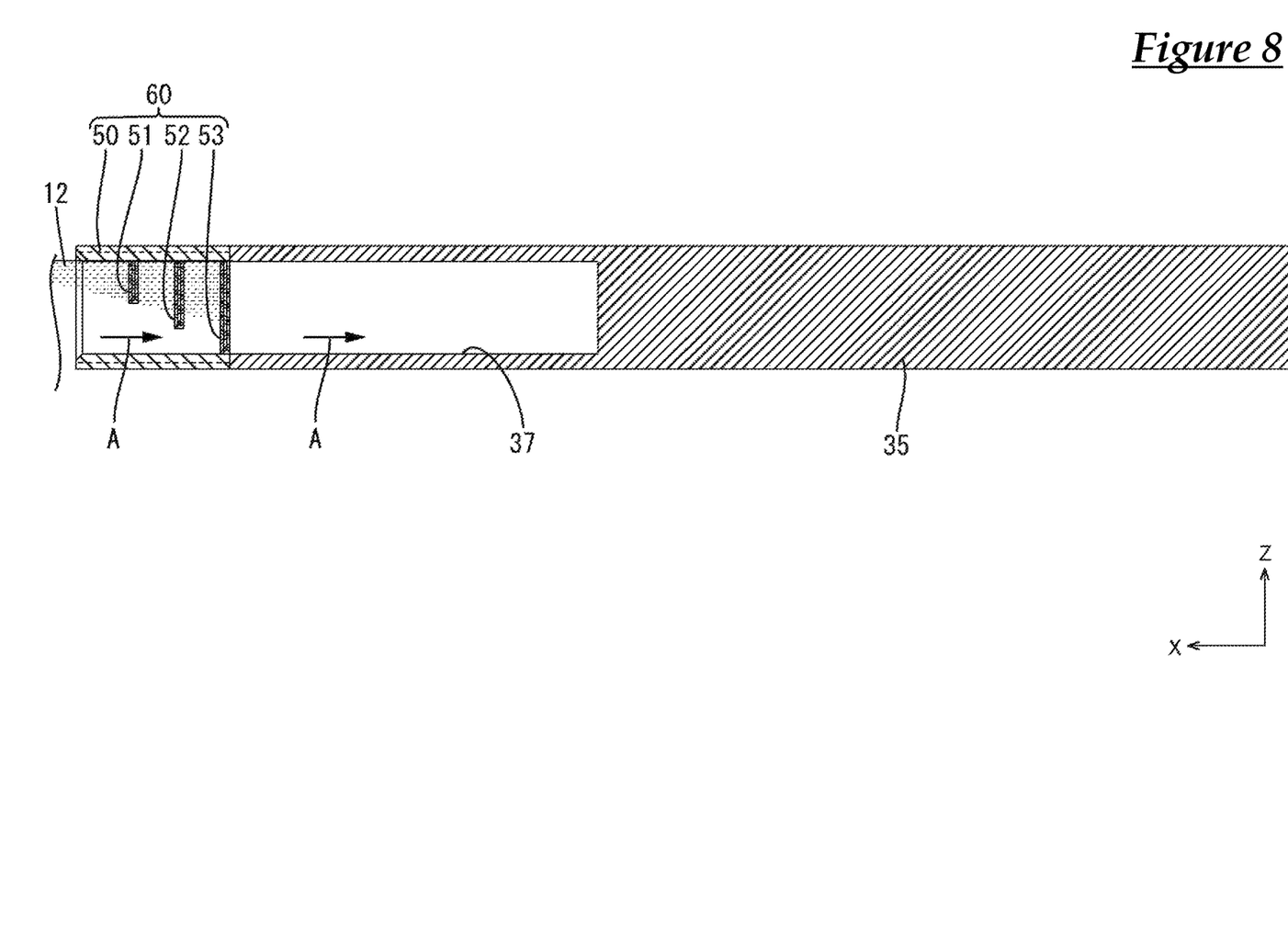
FIG. 8 is a cross-sectional view illustrating an oil-bubble reducing structure according to Embodiment 2.
Figure 9:
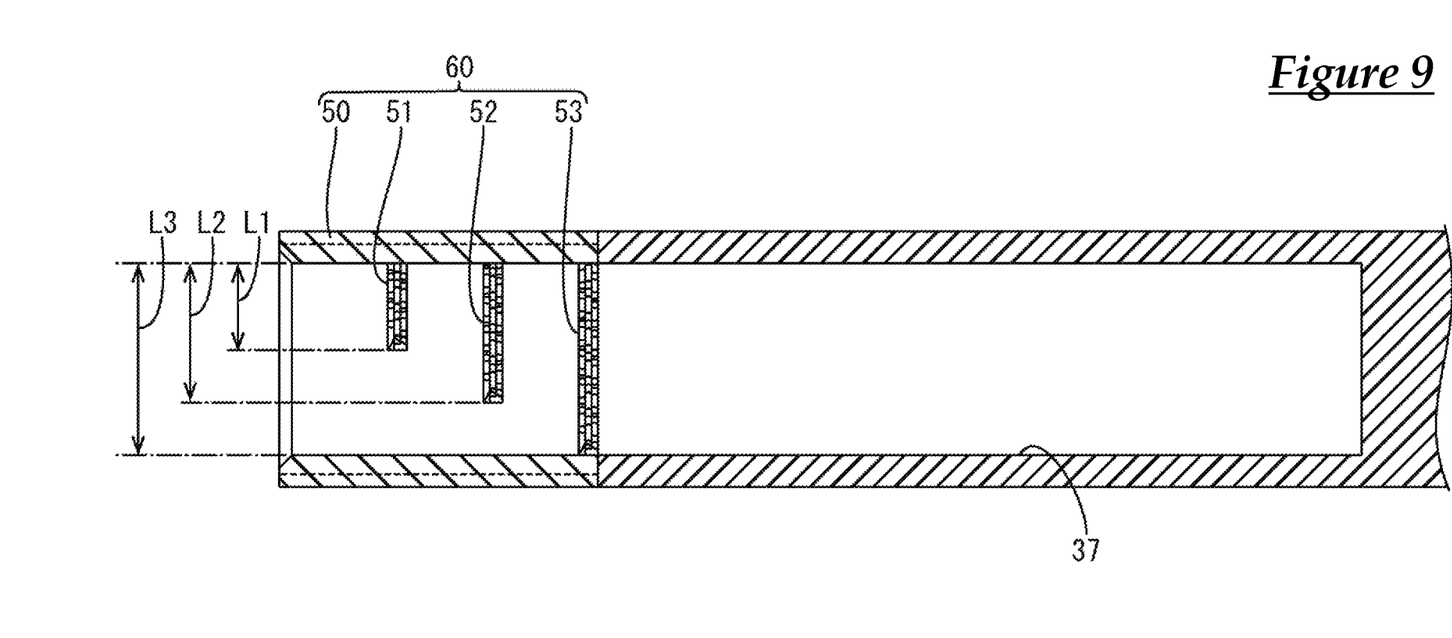
FIG. 9 is an enlarged cross-sectional view of the oil-bubble reducing structure.

The following will describe Embodiment 2 with reference to FIGS. 8 and 9. An oil-bubble reducing structure 60 according to the present embodiment is provided with: a tubular part 50; and a first filter 51, a second filter 52, and a third filter 53, which are provided on the tubular part 50. The tubular part 50 constitutes a part of the oil path 37.

In the tubular part 50, the first filter 51, the second filter 52, and the third filter 53, in the stated order from the upstream side in a direction in which oil 12 flows (direction indicated by an arrow A), are formed extending downward from the upper wall of the tubular part 50. The first filter 51, the second filter 52, and the third filter 53 are lined up at intervals in the direction in which oil 12 flows.

The dimensional relationship between a protrusion length L1 of the first filter 51 from the upper wall of the tubular part 50, a protrusion length L2 of the second filter 52 from the upper wall of the tubular part 50, and a protrusion length L3 of the third filter 53 from the upper wall of the tubular part 50 is given as $L1<L2<L3$. In other words, the protrusion lengths of the first filter 51, the second filter 52, and the third filter 53 from the upper wall of the tubular part 50 increase from the upstream side toward the downstream side with respect to the direction in which oil 12 flows.

The size of the third filter 53 corresponds to the opening area at the left end of the tubular part 50. Accordingly, the oil 12 flowing through the tubular part 50 does not fail to pass through the third filter 53.

Configurations other than the above-described ones are substantially the same as those of Embodiment 1, and thus the same reference signs are given to the same members and a redundant description is omitted.

According to the present embodiment, firstly, using the first filter 51, which is arranged on the most upstream side, the number of oil bubbles contained in the oil 12 that has passed through the first filter 51 can be reduced. At this time, since the first filter 51 has the smallest protrusion length L1, which is the size of the first filter 51 protruding from the upper wall of the tubular part 50, the oil flowing through the oil path 37 includes a portion thereof that has not passed through the first filter 51. The number of oil bubbles contained in the portion of the oil 12 that has not passed through the first filter 51 has not been reduced.

Then, when the oil 12 passes through the second filter 52, which is disposed second from the upstream side, since the number of oil bubbles has been reduced in the region on the downstream side of the first filter 51 arranged on the most upstream side, the second filter 52, which is disposed second from the upstream side, is prevented from being clogged with oil bubbles. On the other hand, the number of oil bubbles is reduced in the portion of the oil 12 that has not passed through the first filter 51 but has passed through the second filter 52.

Then, when the oil 12 passes through the third filter 53, which is disposed third from the upstream side, since the number of oil bubbles has been reduced in the region on the downstream side of the first filter 51 and the second filter 52, the third filter 53, which is disposed third from the upstream side, is prevented from being clogged with oil bubbles. On the other hand, the oil 12 that has neither passed through the first filter 51 nor the second filter 52 does not fail to pass through the third filter 51, and thus the number of oil bubbles in the oil 12 is here reduced by the third filter 51.

Accordingly, the number of oil bubbles in the oil 12 can be reduced, and the first filter 51, the second filter 52, and the third filter 53 can be prevented from being clogged with oil bubbles.

Other Embodiments

The technique disclosed in the present description is not limited to the above-described embodiments explained in the description and illustrated in the drawings, and the technical scope of the technique disclosed in the present description may encompass, for example, the following embodiments.

The present embodiment has a configuration in which the filter 31 is provided on the upstream side of the pump 35 in the oil path 37, but the technique disclosed in the present description is not limited to this, and the filter 31 may be arranged at any position in the oil path 37.

The present embodiment has a configuration in which seven solenoid valves 16 are lined up, but the technique disclosed in the present description is not limited to this, and the number of solenoid valves 16 may also be one, two to six, or seven or more. Alternatively, the solenoid valves 16 may not necessarily be lined up.

The present embodiment has a configuration in which the filter 31 is provided on the wiring board 23, but the technique disclosed in the present description is not limited to this, and the filter 31 may be provided at any position as long as it is within the path through which the oil 12 flows.

Embodiment 2 has a configuration in which a plurality of filters extend downward from the upper wall of the tubular part, but the technique disclosed in the present description is not limited to this, and a plurality of filters may protrude from a side wall or the bottom wall of the tubular part to the inner side of the tubular part.

Embodiment 2 has a configuration in which the three filters are provided within the tubular part, but the technique disclosed in the present description is not limited to this, and two filters, or four or more filters may be provided within the tubular part.

Embodiment 2 has a configuration in which the plurality of filters are lined up at intervals, but the technique disclosed in the present description is not limited to this, and the plurality of filters may be lined up while being in contact with each other in a direction through which the oil 12 flows.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11: Automatic transmission
12: Oil
18: Wire harness
23: Wiring board
31: Filter
32: Framework
34: Pore
35: Pump
37: Oil path
40: Oil-bubble reducing structure
51: First filter
52: Second filter
53: Third filter
L1: Protrusion length of first filter
L2: Protrusion length of second filter
L3: Protrusion length of third filter

What is claimed is:

1. An apparatus having an oil-bubble reducing structure that is arranged in an automatic transmission, comprising:
a filter arranged in an oil path structure defining an oil path for oil flowing through the automatic transmission, wherein the filter has pores formed in its framework having a polygonal cross section, and the oil path structure is configured to be provided within the automatic transmission,
the oil path structure is provided with a pump for causing the oil to flow, and
the filter is disposed on an upstream side, in a direction in which the oil flows, of the pump in the oil path,
wherein the oil path is provided with a plurality of filters that are lined up in the direction in which the oil flows, and wherein the plurality of filters includes the filter, and
the plurality of filters are lined up in order of increasing protrusion length from an upstream side to a downstream side in a direction in which the oil flows, the protrusion length referring to a size of the filters protruding from an inner wall of the oil path.

2. The apparatus according to claim 1, wherein the oil path structure includes a tubular part that includes an inner wall that at least partially defines the oil path.

3. The apparatus according to claim 2, wherein the tubular part is substantially rectangular parallelepiped in shape.

4. The apparatus according to claim 2, wherein the filter is attached to the tubular part.

5. An apparatus having an oil-bubble reducing structure that is arranged in an automatic transmission, comprising:
- a filter arranged in an oil path structure defining an oil path for oil flowing through the automatic transmission,
- wherein the filter has pores formed in its framework having a polygonal cross section, and the oil path structure is configured to be provided within the automatic transmission,
- the oil path structure is provided with a pump for causing the oil to flow, and
- the filter is disposed on an upstream side, in a direction in which the oil flows, of the pump in the oil path,
- wherein the automatic transmission includes a wiring board on which a wire harness is arranged, and
- the filter is disposed on the wiring board.

* * * * *